Figure 3:
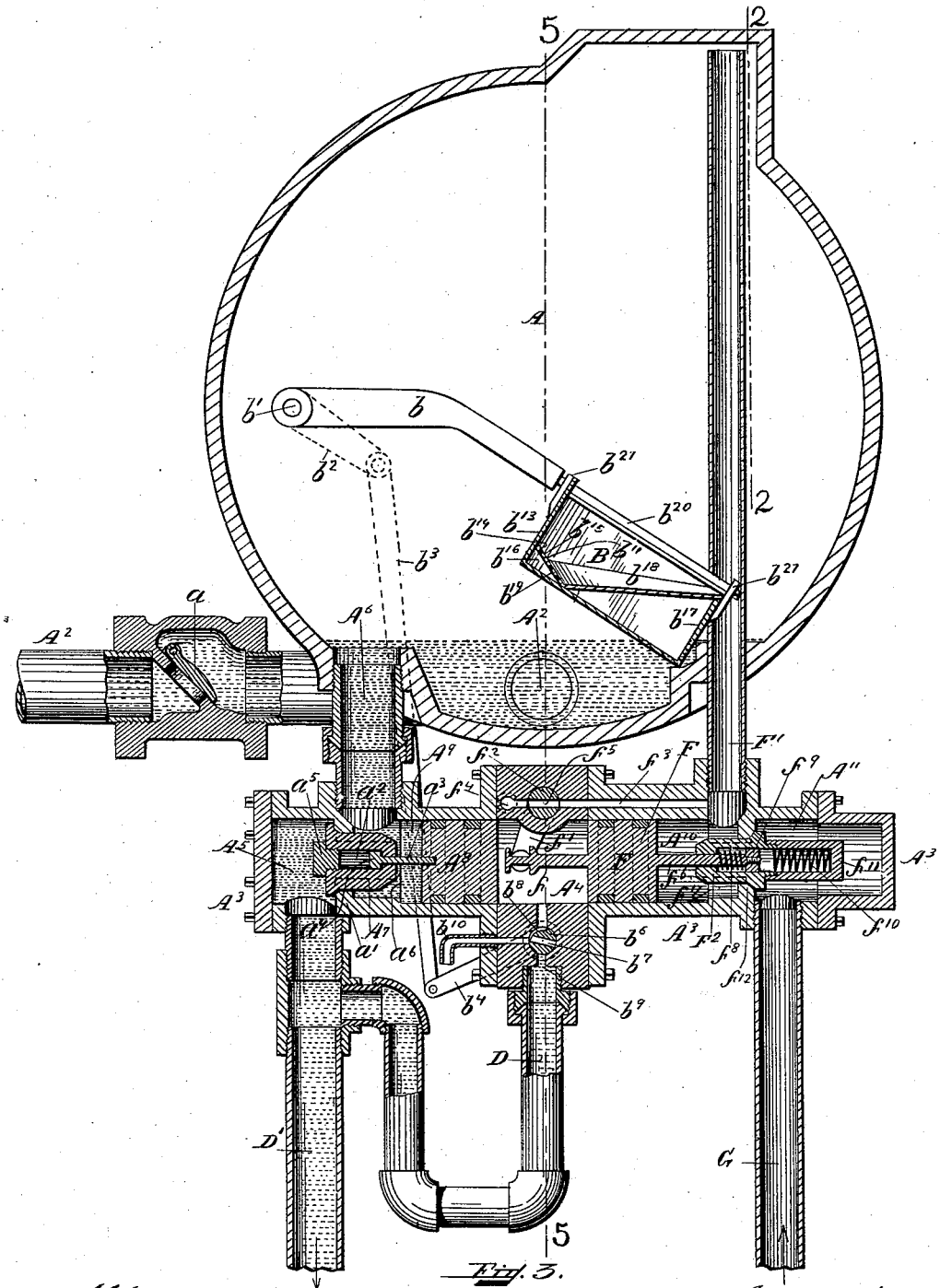

(No Model.) 3 Sheets—Sheet 1.
A. T. MacCOY.
AUTOMATIC BOILER FEEDER.
No. 592,061. Patented Oct. 19, 1897.
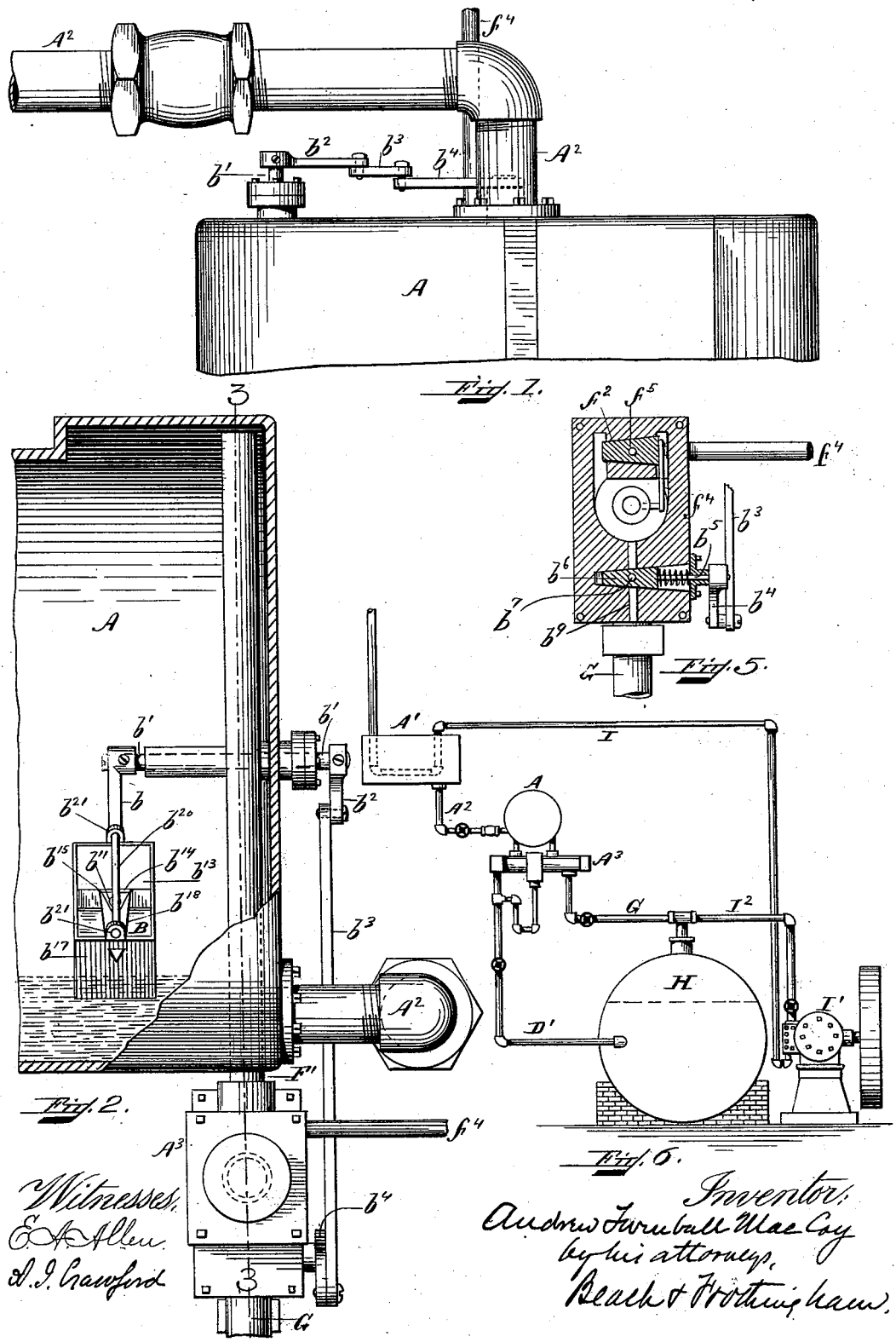
Witnesses:
E. A. Allen
D. J. Crawford
Inventor:
Andrew Turnbull MacCoy
by his attorneys,
Beach & Frothingham

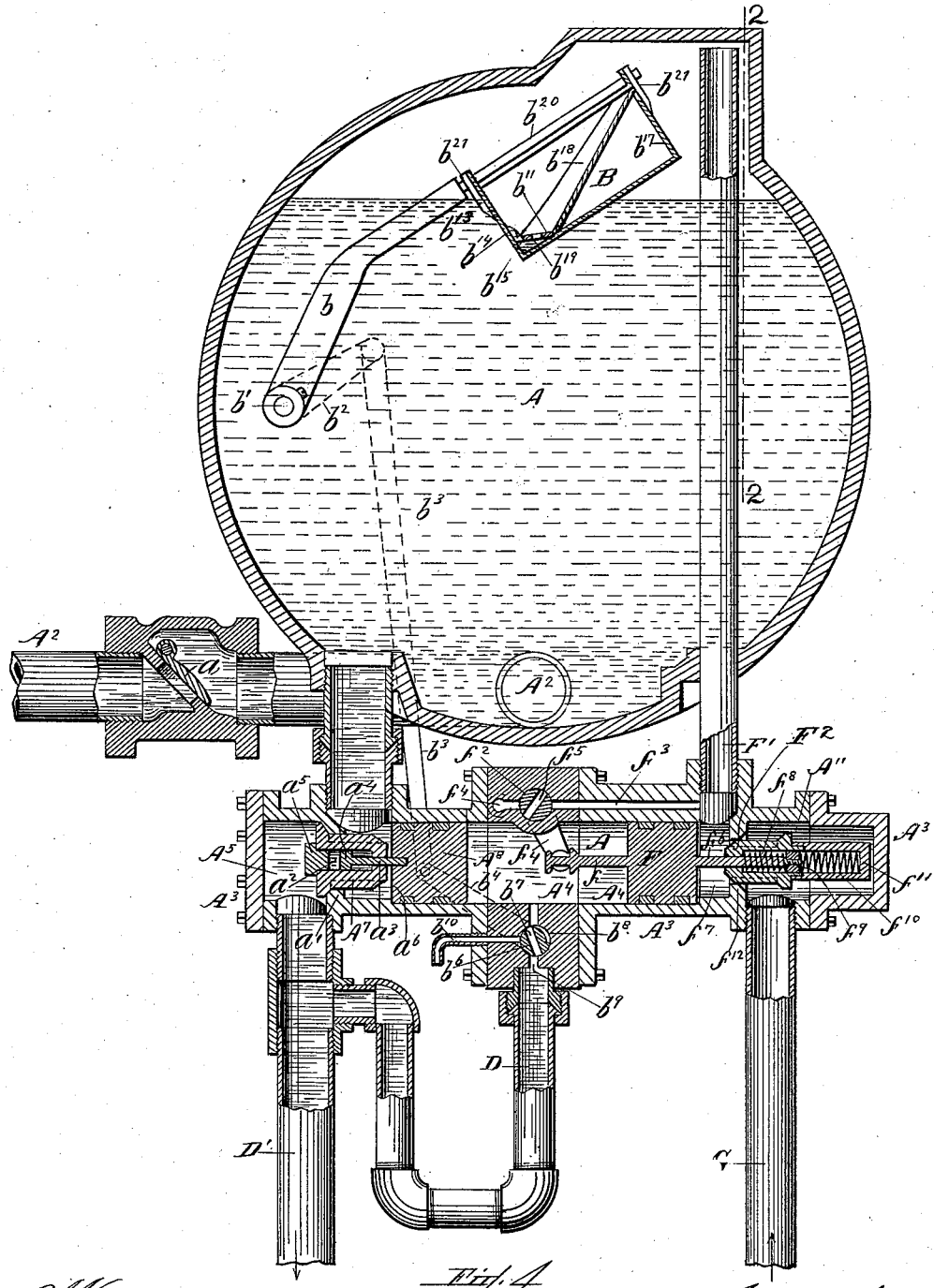

UNITED STATES PATENT OFFICE.

ANDREW TURNBULL MacCOY, OF BOSTON, MASSACHUSETTS.

AUTOMATIC BOILER-FEEDER.

SPECIFICATION forming part of Letters Patent No. 592,061, dated October 19, 1897.

Application filed December 9, 1896. Serial No. 615,014. (No model.)

*To all whom it may concern:*

Be it known that I, ANDREW TURNBULL MACCOY, a subject of the Queen of Great Britain, residing in Boston, in the county of Suffolk and State of Massachusetts, have invented a new and useful Improvement in Automatic Boiler-Feeders, of which the following is a specification, reference being had to the accompanying drawings, in which—

Figure 1 is a top plan view of part of my new automatic boiler-feeder. Fig. 2 is a side elevation, partly in section, on line 2 2 of Fig. 3. Fig. 3 is a sectional view of my complete apparatus at line 3 3 of Fig. 2. This view shows the several parts in inoperative position. Fig. 4 is a view similar to that of Fig. 3, but shows the parts in approximately operative position. Fig. 5 is a partial sectional view at line 5 5 of Fig. 3, showing details of mechanism for controlling the apparatus. Fig. 6 is a view showing my new automatic boiler-feeder in combination with a steam boiler and engine.

The object of my invention is to form a cheap and practical boiler-feeder which is automatic in operation and works on my new principle of feeding feed-water by gravity when the water is subjected to boiler-pressures.

My invention consists, broadly, in the combination of a feed-water reservoir, suitable conduits and valves therefor to operatively connect the feeder with a steam-boiler, and an automatic controller for the valves.

In the drawings illustrating the principle of my invention and the best mode now known to me of applying that principle, A is a reservoir supplied with water from any suitable source. In the present instance, an elevated tank A' is shown as a suitable source, the essential point respecting the source of water-supply to reservoir A being that the water shall come into the reservoir in such wise as to tend to fill it.

$A^2$ represents the water-inlet conduit, which is supplied with a suitable check-valve $a$, that operates to prevent backflow.

In Fig. 3 the parts of my new boiler-feed are shown in inoperative position, and the feeder may be supposed to be connected with a steam-boiler, as shown in Fig. 6. A movable valve-adjuster B is mounted within reservoir A conveniently by a rod $b$, attached to the valve-adjuster and secured to a rocker-shaft $b'$, suitably journaled, for example, in a sleeve fixed in a side of reservoir A. The valve-adjuster in this preferred construction is a swinging float, but various other kinds of valve-adjusters may be employed. I hereinafter refer to the valve-adjuster as a "float" for the sake of brevity, and not in the limited sense which the word itself might indicate but for this explanation. Rocker-shaft $b'$ is provided with an exterior rocker-arm $b^2$, which is jointed to a link $b^3$, that is jointed at $b^4$ to the stem $b^5$ of the rocker-valve $b^6$. Valve $b^6$ is comprised in the automatic valve-controller $A^3$, and is provided with a transverse passage $b^7$, which is intersected by a partial circumferential groove $b^8$. Valve-controller $A^3$ is formed with a passage $b^9$, which leads from conduit D through the chamber in which valve $b^6$ is rotatively mounted into chamber $A^4$ within controller $A^3$. Conduit D forms a dependent water reservoir and passage and leads to the boiler-feeding pipe or conduit D'. This feed-pipe D' leads from chamber $A^5$ in controller $A^3$, chamber $A^5$ being in communication with the outlet $A^6$ of reservoir A. A valve $A^7$ is mounted in controller $A^3$, between chamber $A^5$ and the outlet-pipe $A^6$. Controller $A^3$ is formed interiorly with a seat $a'$ for valve $A^7$, this valve seating on the boiler-feed side of seat $a'$. Valve $A^7$ is formed with a cylindrical chamber $a^2$, which extends from the head or seat end of the valve part way to its foot, the body of valve $A^7$ being formed from the bottom of chamber $a^2$ to and through its foot end with an opening of reduced diameter to receive the shank of a coupling $a^3$, which is fast to piston $A^8$ within controller $A^3$. Coupling $a^3$ has a flanged head $a^4$ within the chamber $a^2$, and the coupling is capable of reciprocation in said chamber $a^2$, the mouth of which is suitably sealed by the screw $a^5$. The foot of valve $A^7$ is exposed to water-pressure from tank A through outlet-pipe $A^6$, which opens into chamber $A^9$ in controller $A^3$, and at the foot end of valve $A^7$. Piston $A^8$ is mounted between the chamber $A^9$ and chamber $A^4$, which chamber is in turn separated from a chamber $A^{10}$ in controller $A^3$ by a piston F. This piston F is formed with an arm $f$, which is within chamber $A^4$ and connected with the rocker-arm $f'$ of rocker-valve $f^2$, mounted in the controller $A^3$, across the conduit $f^3$, which leads from steam-pipe $F'$ to exhaust-hole $f^4$, leading through the casing to the open air. Valve $f^2$ is formed with a transverse passage $f^5$, which when in line with conduit $f^3$ permits the escape of the exhaust. Piston F is also provided with an arm $f^6$, which is within chamber $A^{10}$ and reciprocates through valve $F^2$, that is seated between the chamber $A^{10}$ and a chamber $A^{11}$ also within casing $A^3$. Valve $F^2$ is chambered from end to end, that portion of the chamber which is on the foot side of the valve toward chamber $A^{10}$ being of smaller diameter than the remaining portion of the chamber to form an abutment $f^7$ for a helix $f^8$, mounted between abutment $f^7$ and a washer $f^9$, fast on piston-arm $f^6$. A spring $f^{10}$ is mounted in a casing $f^{11}$, which is connected to the head of valve $F^2$, and at a certain time, hereinafter mentioned, comes into operation by the impact of washer $f^9$ on piston-arm $f^6$. Live-steam pipe or conduit G from the upper part of the boiler H communicates with chamber $A^{11}$, which is separated from chamber $A^{10}$ by a valve-seat $f^{12}$ and valve $F^2$, the valve-seating on the side toward chamber $A^{11}$ receiving the live steam. The conduit or steam-pipe $F'$ leads from chamber $A^{10}$ upwardly into and well toward the upper wall of reservoir A.

The operation of my new boiler-feeder is as follows: Water flowing from tank $A'$ or any other suitable source—for I wish it to be distinctly understood that my invention is not limited to the use of a tank, because reservoir A may be connected if desired to any aqueduct or water-pipe from a suitably-elevated source, or with a siphon from a body of water—past check-valve $a$ enters and tends to fill the reservoir A. When the water reaches float B, the same is gradually lifted, and the valve $b^6$ is turned so as to bring its passage $b^7$ in line with the passage $b^9$ in the casing. Conduit $D'$, which is connected with boiler H, is kept normally filled with water by the pressure of the steam in the boiler, and as conduit D communicates with conduit $D'$ the former is also normally full of water, under pressure, up to the valve $b^6$. Therefore, when valve-passage $b^7$ is in line with passage $b^9$, water flows from conduit D into chamber $A^4$, effecting movement in opposite directions of both pistons $A^8$ and F. Piston $A^8$ continues to move until it brings up against abutment $a^6$ in chamber $A^9$. The arm $a^3$ of piston $A^8$ is thereby moved toward the head of valve $A^7$, the head of flange $a^4$ of the piston-arm $a^3$ being a loose fit in chamber $a^2$. The extent of the movement of piston-arm $a^3$ is not sufficient to cause the described movement of piston $A^8$ to unseat valve $A^7$. Referring now to piston F, which is moving in the other direction, the rocker-arm $f'$ of the rocker-valve $f^2$ is carried to the right, and carries valve-passage $f^5$ against the surface of its bearing, thereby closing the valve and shutting off the exhaust. As the valve F continues its movement toward valve $F^2$ the washer $f^9$ on piston-arm $f^6$ presses against spring $f^{10}$ and compresses this spring slightly before the piston F contacts with the foot end of valve $F^2$; but in its movement, referred to, the piston contacts with valve F and forces it from its seat. Live steam from steam-pipe G and the top of boiler H now flows past valve $F^2$ into pipe $F'$ and out into reservoir A above the water therein. The piston F is arrested in its movement toward valve $F^2$ by the abutment $f^7$. As soon as the steam-pressure in conduit G, chamber $A^{11}$, that part of chamber $A^{10}$ underneath pipe $F'$, and $F'$ is equalized around valve $F^2$, the compressed spring $f^{10}$ automatically expands and pulls valve $F^2$ completely off its seat; for the equalization of the steam-pressure by the expansion or escape of steam from pipe G, past valve $F^2$ into pipe $F'$ takes the load due to the pressure of the steam while it was imprisoned in pipe G and chamber $A^{11}$ off the outer end of spring-casing $f^{11}$, and allows the slightly-compressed spring to expand, and this expansion of the spring against washer $f^9$ as an abutment completely unseats valve $F^2$. The object of this part of my invention is to insure the keeping open of the valve $F^2$, thereby insuring a constant flow of steam from the boiler into the space in reservoir A above the feed-water. There is now secured a certain steam-pressure on the upper surface of the feed-water. The float B has been lifted, by the water flowing in at $A^2$, well up toward the top of reservoir A. The valve $A^7$ is still on its seat; but when the steam-pressure on the top of the feed-water in tank A becomes the same, as it speedily does, as the pressure of water in pipe $D'$, the weight of the feed-water in reservoir A and resting on the foot of valve $A^7$, forces valve $A^7$ off its seat and allows the feed-water to flow freely and continuously to the boiler until the reservoir is emptied, for the steam-pressure on the feed-water closes valve $a$ when the steam first pushes on the feed-water, and keeps valve $a$ closed until steam is out of reservoir A. As the feed-water lowers in reservoir A float B descends, carrying with it rocker-arms $b^3$ and $b^4$, rocking valve $b^6$ and closing or seating it almost instantly the float begins to descend. When the float approximates its lowest position, valve $b^6$ is moved into the position shown in Fig. 3, the grooved passage $b^8$ now communicating with the upper portion of passage $b^9$ and the discharge-pipe $b^{10}$, whereby the water in chamber $A^4$ escapes and reduces the pressure in chamber $A^4$ between pistons $A^8$ and F. The steam-pressure through tank A forces the residue of water in pipe $A^6$ and chamber $A^9$ against piston $A^8$ and forces it back to its normal position, as shown in Fig. 3. This return of piston $A^8$ pulls valve $A^7$ on its seat tightly and this valve is kept seated by the high pressure in reservoir A. Simultaneously with this movement of piston $A^8$, the piston F moves in the direction of piston $A^8$, carrying with it and seating valve $F^2$. As the valve $F^2$ reaches its seat the still effective steam-pressure on the face of piston F in chamber $A^{10}$ forces the piston to travel until its arm $f$ has pushed the rocker-valve arm $f'$ sufficiently far to open valve $f^2$, which is the steam-exhaust valve. The steam-pressure is now reduced through the exhaust; or, if one does not care to use the exhaust to now reduce the pressure in reservoir A, the pressure will be dissipated by condensation in a very short time; but as hot water generates its own steam, an exhaust is desirable.

The float B is, in some practical form or other, an important feature of the automatic form of my invention. A hollow ball, such as commonly used in steam-traps, cisterns, elevated tanks, and the like, is not desirable for use in my feed-water reservoir, because liable to be crushed by the steam-pressure. A flat float of wood or cork or other composition might be used in some cases, at least for short periods, but is undesirable because of the tendency of wood to become water-logged, and of the disintegrating action of the steam on most available compositions. I accordingly prefer to make float B of metal, dish-shaped and mounted with its bottom toward the feed-water. Inasmuch as there is more or less condensation of steam in the upper part of the reservoir, the dished float has a constant tendency to fill, and to prevent undue accumulation of water in the dished float, I provide it with means for automatically emptying any water that may get into it. These means consist, preferably, of a transverse plate $b^{11}$, one edge of which is made tight to the inner surface of the bottom of the dished float. The ends of this plate are soldered to the sides of the float, and the plate is upwardly inclined toward the rear end $b^{13}$ of the float, with a space $b^{14}$ between its upper edge $b^{15}$ and rear end $b^{13}$ to permit flow of accumulated water over plate $b^{11}$, through space $b^{14}$ into chamber $b^{16}$, when the float is in a raised position (see Fig. 4) with its front end $b^{17}$ higher than its rear end $b^{13}$. From the front end $b^{17}$ of the float, a trough $b^{18}$ extends downwardly to the juncture of the inclined plate $b^{11}$ with the bottom of the float. Plate $b^{11}$ is perforated at $b^{19}$ between the side walls of the trough $b^{18}$, so that when the float falls in the feed-water reservoir, and its outer end is the lower, water in chamber $b^{16}$ is discharged through trough $b^{18}$ and the dished float automatically emptied. Chamber $b^{16}$ is formed by the opposed walls of the rear end of the float and plate $b^{11}$. Float B is preferably loosely hinged on arm $b$, this arm having an extension $b^{20}$, which passes loosely through holes in ears $b^{21}$ at opposite ends of the dished float B. The purpose of this construction is to keep the open side of the float uppermost, and is important especially in connection with marine boilers, where the float might be accidentally filled in consequence of the rolling of the vessel.

The apparatus above described is the best commercial form of my invention known to me, because it is wholly automatic in its action; but my method and the simple non-automatic embodiment of my invention form the subject-matter of my application, Serial No. 615,013, filed herewith, and marked "Case A." This automatic form comprises, when considered in connection with a boiler to which it is attached, three principal elements: first, a feed-water reservoir; second, a boiler, and, third, an automatic valve-controller, of any suitable construction, for the valves which open and stop the pipes or conduits that connect the boiler and reservoir. In the present instance the automatic valve-controller $A^3$ is a controller for both the steam-feed valve $F^2$ and the water-feed valve $A^7$, and it has a duplex action in the sense that it controls both these valves $F^2$ and $A^7$.

The feeder and combination shown in Figs. 1 to 6 are practical, automatically-operating embodiments of my invention as heretofore successfully used by me in actual practice.

The marked advantages of my invention are that, unlike boiler feed-pumps, it may be used to feed water which is at or above the boiling-point; that, unlike injectors, it may be used to feed warm or boiling water; that it is cheaper in construction and simpler in mode of operation than the pumps or injectors heretofore commonly used.

Another distinct advantage, which is an effect new in kind and intrinsically due to my invention or discovery, consists in the fact that approximately volume for volume of water and steam may be used to accomplish the feeding of the water. Thus, if the reservoir contains a cubic foot of water, approximately one cubic foot of steam is utilized in the delivery of the cubic foot of water to the boiler; but it will be understood by all skilled in the art that the feed-water reservoir should be within such distance of the boiler as to utilize the normal steam-pressure in the boiler. Another effect new in kind and due to my invention is the feeding to the boiler of water which is at the boiling-point in the open air. No boiler feed-pump or steam-pump of any kind heretofore devised has been capable, so far as I know, of pumping water at its boiling-point. By heating the feed-water (in the tank which supplies my reservoir) to the boiling-point, boiling water is supplied to the reservoir and there fed to the boiler; for although the temperature of the water in the tank is apt to be slightly reduced in its flow to the reservoir, the heat of the boiler steam in the reservoir compensates for the loss of heat in the water flowing from the tank. The presence of any steam in a pump-cylinder prevents the use of the maximum volume of water which the pump-cylinder is adapted to contain, and consequently a pump is not adapted to utilize volume for volume of water and steam, as is the case with my apparatus.

I prefer to heat water in the tank A', if a tank be used to supply reservoir A, to the boiling-point for reasons hereinbefore set forth. Any suitable means may be used for heating the water in the tank—such, for example, as a gas jet or stove—but I prefer to lead the exhaust-steam pipe from the engine into the tank and to heat the water by the exhaust-steam, after the fashion illustrated in Fig. 6, where exhaust I from engine-cylinder I' leads into and through the tank. A conduit $I^2$ leads from the boiler steam-pipe G to the cylinder I', as will be plain to all skilled in the art.

The boiler-pressures exerted on the body of feed-water may be steam and water pressures or steam and steam-pressures, as preferred. Thus, if the opposing boiler-pressures are to be steam and water pressures, the conduits D' and G will be connected, respectively, to the water-containing and steam-containing portions of the boiler; but if these boiler-pressures are to be steam and steam-pressures, then both conduits D' and G will be connected to the steam-containing portion of the boiler.

The automatically-emptying float is capable of use under many other conditions and for other purposes than those described, and the same constitutes an independent feature of my invention.

What I claim is—

1. The combination of a feed-water reservoir and an automatic valve-controller having passages communicating with said reservoir; and comprising independent pistons, a pressure-chamber between them; and valves which automatically control said passages; and means for attachment to a steam-boiler; the valves being attached to said pistons.

2. The combination of a steam-boiler; a feed-water reservoir therefor; and an automatic valve-controller having passages communicating with said reservoir and the boiler; and valves for said passages; a piston to which each valve is secured a pressure-chamber between said pistons; a conduit connecting said pressure-chamber and the boiler; a valve for said conduit and an automatically-operated float within the reservoir and connected to said valve.

3. The combination of a boiler with a feed-water reservoir; the boiler being in communication with the upper and under portions of the reservoir; and automatic means including independent pistons; attached valves; a pressure-chamber between the pistons and auxiliary exhaust-valves to control the passage from the boiler of steam to the reservoir and of feed-water from the reservoir to the boiler.

4. The combination of a steam-boiler with a feed-water reservoir; a conduit from a source of water-supply to the reservoir; a conduit connecting the upper portion of the boiler with the upper portion of the reservoir; a conduit connecting the boiler with the lower portion of the reservoir; a check-valve to prevent backflow from the reservoir into the water-source conduit; and an automatic controller for said boiler-pressure conduits; said controller comprising independent pistons and valves for said connecting-conduits, the valves being movable in relation to their stems which are secured to said pistons.

5. As a new article of manufacture, a boiler-feeder, comprising a feed-water reservoir, and an automatic valve-controller; the controller being in conduit communication with the upper and under portions of the reservoir; and having in communication with conduits, openings for attachment of the device to a steam-boiler; and also having automatic mechanism which controls the steam and water passages through the controller by means of suitable valves attached to independent pistons operated by boiler-pressure in a chamber thereinbetween, the piston of the steam-supply valve being attached to a steam-exhaust valve.

6. The combination with a feed-water reservoir and an automatic valve-controller having a chamber in communication with the under portion of the reservoir, and a chamber in communication with the upper portion of the reservoir; an opening from each of said chambers for connection with the steam-boiler; a valve for each of said openings; independent pistons controlling said valves; a float within the reservoir and mechanism for automatically controlling a valve which controls a conduit leading into a chamber between said pistons; a pressure-chamber having an outlet controlled by the valve between the pistons; an exhaust-conduit from the steam-conduit, and a valve for the same controlled by the piston controlling the steam-conduit.

7. The herein-described automatic, valve-controllers for boiler-feeders, comprising a lengthwise-chambered case; transversely-arranged valve-seats near the ends thereof; a chamber at each end between each transverse valve-seat and a case end; a chamber between said valve-seats; independent pistons in said intermediate chamber with a space between their opposed ends; a valve attached to each piston; a port near each valve-seat, at the inner side thereof; a port for each end chamber; a port for the space between the opposed ends of the pistons; a valve for said port; an exhaust-conduit from the steam-escape port; a valve for said conduit, and in operation connected with one of said pistons.

8. In a boiler-feeder, the combination of a casing having chambers $A^{10}$, $A^{11}$ separated by a valve-seat; a valve and a piston; the valve being chambered and the piston having an arm loosely mounted in said chamber, a pressure-chamber and a port thereto controlled by a valve operated by water in the reservoir.

9. In a boiler-feeder, the combination of a casing having chambers $A^{10}$, $A^{11}$ separated by a valve-seat; a valve and a piston; the valve being chambered and the pistons having an arm loosely mounted in said chamber; and provided with an enlargement near the free end of the arm; a spring between said enlargement and an end wall of the chamber of the valve; and a spring in the valve-chamber between said enlargement and the butt-end wall of the valve-chamber a pressure-chamber and a port thereto controlled by a valve operated by water in the reservoir.

10. In a boiler-feeder, the combination of a case having chambers $A^{10}$ $A^{11}$ separated by a valve-seat; a valve and a piston attached thereto; one chamber $A^{10}$ being between the piston and the head of the valve; and the other chamber $A^{11}$ being between the valve-seat and an end of the case; the butt-end of the valve projecting into the latter chamber; a steam-inlet port for said latter chamber; and a steam-exit port for the chamber between the piston and the head of the valve, a pressure-chamber and a port thereto controlled by a valve operated by water in the reservoir.

11. In a boiler-feeder, the combination of a case having chambers formed by a transverse valve-seat; a valve and a piston attached thereto; the valve-seat being in one chamber and the piston in the other; and the piston and valve being at a distance apart to form a space between their opposed walls, a pressure-chamber and a port thereto controlled by a valve operated by water in the reservoir.

12. In a boiler-feeder, the combination of an automatic valve-controller having independent pistons and attached valves; of a port opening into a space in said case between the opposed ends of the pistons; a valve controlling said port; a U-shaped conduit; a feed-water conduit; a U-shaped conduit connecting the valve-controlled port with the feed-water conduit; a feed-water reservoir; an automatically-operated valve-controller in said reservoir; and means connecting said controller with the valve for said port.

13. In a boiler-feeder, the combination of an automatically-emptying float; a feed-water reservoir within which the same is contained; an oscillating valve operatively connected with said float and operated thereby; and a feed-water conduit having an exhaust; said oscillating valve controlling said feed-water conduit and said exhaust a pressure-chamber and a piston connected to a valve.

In testimony whereof I have signed my name to this specification, in the presence of two subscribing witnesses, on this 8th day of December, A. D. 1896.

ANDREW TURNBULL MacCOY.

Witnesses:
EDWARD S. BEACH,
N. L. FROTHINGHAM.